United States Patent Office 3,830,882
Patented Aug. 20, 1974

3,830,882
SEMICARBAZONO PHOSPHORUS COMPOUNDS
Leonard J. Stach, Riverside, Ill., assignor to Velsicol
Chemical Corporation, Chicago, Ill.
No Drawing. Filed Nov. 16, 1972, Ser. No. 307,262
Int. Cl. C07f 9/16, 9/24; A01n 9/36
U.S. Cl. 260—923                         6 Claims

ABSTRACT OF THE DISCLOSURE

This invention discloses new compounds of the formula

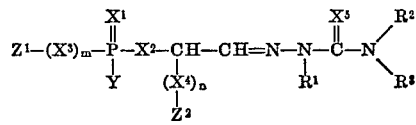

wherein $X^1$, $X^2$, $X^3$, $X^4$ and $X^5$ are independently selected from the group consisting of oxygen and sulfur; $m$ and $n$ are each integers from 0 to 1; $Z^1$ is selected from the group consisting of alkyl, alkenyl and

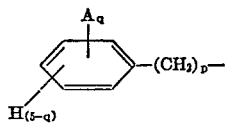

wherein A is selected from the group consisting of alkyl, alkenyl, alkoxy, alkylthio, haloalkyl, halogen, nitro, alkylsulfoxide, alkylsulfone and dialkylamino; and $q$ and $p$ are each integers from 0 to 3; $Z^2$ is selected from the group consisting of hydrogen and $Z^1$, provided that when $Z^2$ is hydrogen then $n$ is zero; Y is selected from the group consisting of alkyl, alkenyl, alkoxy, alkenyloxy, alkylthio, amino, alkylamino, dialkylamino and

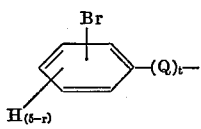

wherein B is selected from the group consisting of alkyl, alkenyl, alkoxy, alkylthio, halogen, nitro, alkylsulfoxide, alkylsulfone and dialkylamino; $r$ is an integer from 0 to 3; Q is selected from the group consisting of oxygen, sulfur, alkylene, alkyleneoxy and alkylthio; and $t$ is an integer from 0 to 1; $R^1$ is selected from the group consisting of hydrogen and alkyl; and $R^2$ and $R^3$ are independently selected from the group consistnig of hydrogen, alkyl, alkenyl, haloalkyl, cycloalkyl and

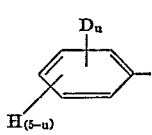

wherein D is selected from the group consisting of alkyl, alkenyl, alkoxy, alkylthio, halogen, haloalkyl, nitro and dialkylamino; and $u$ is an integer from 0 to 3. The compounds of the above description are useful as insecticides.

This invention relates to new compositions of matter and more specifically relates to new chemical compounds of the formula

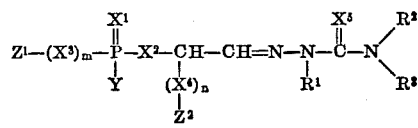
(I)

wherein $X^1$, $X^2$, $X^3$, $X^4$ and $X^5$ are independently selected from the group consisting of oxygen and sulfur; $m$ and $n$ are each integers from 0 to 1; $Z^1$ is selected from the group consisting of alkyl, alkenyl, and

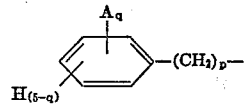

wherein A is selected from the group consisting of alkyl, alkenyl, alkoxy, alkylthio, haloalkyl, halogen, nitro, alkylsulfoxide, alkylsulfone and dialkylamino; and $q$ and $p$ are each integers from 0 to 3; $Z^2$ is selected from the group consisting of hydrogen and $Z^1$, provided that when $Z^2$ is hydrogen then $n$ is zero; Y is selected from the group consisting of alkyl, alkenyl, alkoxy, alkenyloxy, alkylthio, amino, alkylamino, dialkylamino and

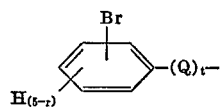

wherein B is selected from the group consisting of alkyl, alkenyl, alkoxy, alkylthio, halogen, nitro, alkylsulfoxide, alkylsulfone and dialkylamino; $r$ is an integer from 0 to 3; Q is selected from the group consisting of oxygen, sulfur, alkylene, alkyleneoxy and alkylthio; and $t$ is an integer from 0 to 1; $R^1$ is selected from the group consisting of hydrogen and alkyl; and $R^2$ and $R^3$ are independently selected from the group consisting of hydrogen, alkyl, alkenyl, haloalkyl, cycloalkyl and

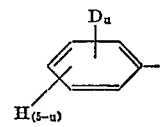

wherein D is selected from the group consisting of alkyl, alkenyl, alkoxy, alkylthio, halogen, haloalkyl, nitro and dialkylamino; and $u$ is an integer from 0 to 3.

The compounds of the present invention are unexpectedly useful as insecticides and acaricides.

In a preferred embodiment of the present invention $Z^1$ is selected from the group consisting of lower alkyl, lower alkenyl, and

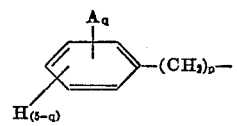

wherein A is selected from the group consisting of lower alkyl, lower alkenyl, lower alkoxy, lower alkylthio, lower chloroalkyl, lower bromoalkyl, trifluoromethyl, chlorine, bromine, fluorine, nitro, lower alkylsulfoxide, lower alkylsulfone and di(lower alkyl)amino; and $q$ and $p$ are each integers from 0 to 3; $Z^2$ is selected from the group consisting of hydrogen and the preferred $Z^1$; Y is selected from the group consisting of lower alkyl, lower alkenyl, lower alkoxy, lower alkenyloxy, amino, lower alkylamino, di(lower alkyl)amino and

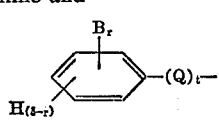

wherein B is selected from the group consisting of lower alkyl, lower alkenyl, lower alkoxy, lower alkylthio, chlorine, bromine, fluorine, nitro, lower alkylsulfoxide, lower alkylsulfone and di(lower alkyl)amino; $r$ is an integer from 0 to 3; Q is selected from the group consisting of oxygen, sulfur, lower alkylene, lower alkyleneoxy and lower alkylenethio; and $t$ is an integer from 0 to 1; $R^1$ is selected from the group consisting of hydrogen and lower alkyl; and $R^2$ and $R^3$ are independently selected from the group consisting of hydrogen, lower alkyl, lower alkenyl, lower chloroalkyl, lower bromoalkyl, cycloalkyl having from 3 to 7 carbon atoms and

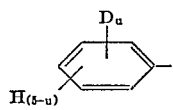

wherein D is selected from the group consisting of lower alkyl, lower alkenyl, lower alkoxy, lower alylthio, chlorine, bromine, fluorine, lower chloroalkyl, trifluoromethyl, nitro and di(lower alkyl)amino; and $u$ is an integer from 0 to 3.

The term lower as used herein designates a straight or branched carbon chain of up to six carbon atoms.

The compounds of the present invention can be readily prepared by reacting a compound of the formula

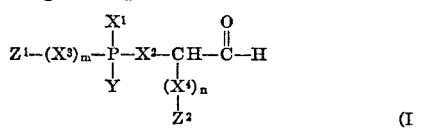

wherein $X^1$, $X^2$, $X^3$, $X^4$, $m$, $n$, $Z^1$, $Z^2$ and Y are heretofore described, with a semicarbazide or thiosemicarbazide of the formula

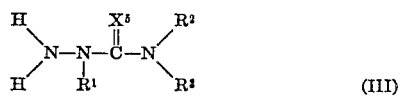

wherein $R^1$, $R^2$, $R^3$ and $X^5$ are as heretofore described. This reaction can be conveniently effected by combining the compound of formula II with an equimolar or slight excess molar amount of the compound of formula III or the hydrochloride of the compound of formula III in an inert organic reaction medium such as absolute ethanol. When the hydrochloride of the compound of formula III is utilized as acid scavenger such as a tertiary amine is preferably utilized. The reaction mixture can then be heated at reflux for a period of from about ½ to about 4 hours. After this time the reaction mixture can be stripped of solvent and the residue redissolved in a water immiscible solvent such as benzene. The resulting solution can be washed with water, dried and stripped of solvent to yield the desired product of this invention.

The compound of formula II can be prepared by reacting a compound of the formula

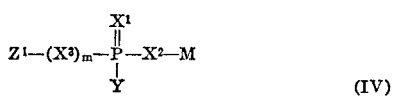

wherein M is an alkali metal and $X^1$, $X^2$, $X^3$, Y, $Z^1$ and $m$ are as heretofore described, with an aldehyde of the formula

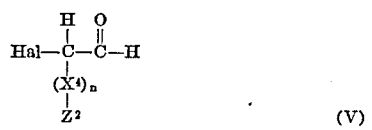

wherein Hal designates halogen and $X^4$, $Z^2$ and $n$ are as heretofore described. This reaction can be conveniently effected by combining the compound of formula IV with the aldehyde of formula V in an inert mutual solvent. When the aldehyde is water soluble, water can be used as the reaction medium. The reaction mixture can then be heated at a temperature of from about 40° C. to the reflux temperature of the mixture for a period of about 15 minutes to about 4 hours. After this time the desired product can be recovered from the reaction medium upon distillation of the solvent used if the product is soluble therein or upon extraction of the oil phase if water was used. The product can then be used as such or can be further purified by conventional means.

The compounds of formula IV are known in the art and can be prepared by the methods described by Malatesta and Pizotti, Chimica e Industria (Milan) 27, 6–10 (1945); and Melnikov and Grapov, Zhur. Vsesoyuz Khim. Obschchestva in D. I. Mendeleeva, 6, No. 1; (119–12) (1961).

Exemplary useful aldehydes of formula V for preparing the compounds of formula II are chloroacetaldehyde,
α-chloropropional,
α-bromobutyral,
α-chloropentanal,
α-chlorohexanal,
α-bromopentanal,
α-chloro-α-phenylacetaldehyde,
α-chloro-α-methoxyacetaldehyde,
α-chloro-α-methylthioacetaldehyde,
α-chloro-α-benzylacetaldehyde,
α-chloro-α-allylacetaldehyde,
α-chloro-α-isopropoxyacetaldehyde,
α-bromo-α-(2-methyl-4-chlorophenyl)acetaldehyde,
α-chloro-α-(2-methoxyphenyl)acetaldehyde,
α-chloro-α-(4-nitrophenyl)acetaldehyde,
α-chloro-α-(3-methylthiophenyl)acetaldehyde,
α-chloro-α-(3,4-dibromophenyl)acetaldehyde,
α-chloro-α-(3-methylsulfonylphenyl)acetaldehyde,
α-chloro-α-(4-dimethylaminophenoxy)acetaldehyde
and the like.

Exemplary useful semicarbazides for preparing the compounds of the present invention are semicarbazide,
thiosemicarbazide,
4-methylsemicarbazide,
4,4-dimethylsemicarbazide,
2-methylsemicarbazide,
2,4,4,-trimethylthiosemicarbazide,
4-isopropylsemicarbazide,
4-hexylsemicarbazide,
4-phenylsemicarbazide,
4-(3,4-dichlorophenyl)semicarbazide,
2-ethyl-4-(2-methyl-4-bromophenyl)thiosemicarbazide,
2-hexyl-4,4-dimethylsemicarbazide,
4-allylsemicarbazide,
4-β-chloroethylsemicarbazide,
4-(3-methoxyphenyl)thiosemicarbazide,
4-(3-methylthiophenyl)semicarbazide,
4-γ-bromopropylsemicarbazide,
4-(4-nitrophenyl)semicarbazide,
4-(4-trifluoromethylphenyl)semicarbazide,
4-(2-dimethylaminophenyl)semicarbazide,
2-methyl-4-cyclopropylsemicarbazide,
2-isopropyl-4-cyclobutylsemicarbazide,
4-methyl-4-cyclopentylsemicarbazide,
4-cyclohexylsemicarbazide,
4-cycloheptylsemicarbazide
and the like.

The manner in which the compounds of the present invention can be prepared is more specifically illustrated in the following examples.

EXAMPLE 1

Preparation of S-(formylmethyl) O,O-diethyl thiolothionophosphate

Aqueous chloroacetaldehyde (17.4 grams; 45% concentration; 0.10 mole), water (20 ml.) and potassium O,O-diethyl thiolothionophosphate (24.64 grams; 0.11 mole) were charged into a glass reaction flask equipped with a mechanical stirrer, thermometer and heating mantle. The reaction mixture was heated for a period of about 30 minutes at a temperature of from 45 to 50° C. resulting in the formation of an oil phase. The reaction mixture was then cooled to room temperature and the oil phase was extracted with ether (80 ml.). The ether extract was washed with water, dried over anhydrous magnesium sulfate, filtered and stripped of solvent on a steam bath. The residue was then heated at a temperature of 70 to 80° C. in vacuo (1.0 mm. Hg pressure) to distill off any unreacted chloroacetaldehyde thereby yielding the desired product S-(formylmethyl) O,O-diethyl thiolothionophosphate as a pale yellow liquid.

EXAMPLE 2

Preparation of S-(2-thiosemicarbazonoethyl) O,O-diethyl thiolothionophosphate

S - (formylmethyl) O,O - diethyl thiolothionophosphate (9.12 grams; 0.04 mole), thiosemicarbazide (4.01 grams; 0.044 mole) and absolute ethanol were charged into a glass reaction vessel equipped with a mechanical stirrer and reflux condenser. The reaction mixture was heated at reflux, with stirring, for a period of about two hours. After this time the ethanol was stripped from the reaction mixture and the residue was dissolved in benzene. The benzene solution was washed with water and was dried over anhydrous magnesium sulfate. The dried solution was then stripped of solvent to yield the desired product S-(2-thiosemicarbazonoethyl) O,O-diethyl thiolothionophosphate as an oil.

EXAMPLE 3

Preparation of S-(2-semicarbazonoethyl) O,O-diethyl thiolothionophosphate

S - (formylmethyl) O,O - diethyl thiolothionophosphate (5.0 grams; 0.022 mole), absolute ethanol (60 ml.), semicarbazide hydrochloride (3.66 grams; 0.033 mole) and pyridine (2.61 grams) were charged into a glass reaction vessel equipped with a mechanical stirrer, reflux condenser and heating means. The reaction mixture was heated at reflux for a period of about 30 minutes. After this time the mixture was allowed to stand at room temperature overnight. The reaction mixture was then stripped of ethanol and the residue was dissolved in methylene chloride. The resulting solution was washed with water and was dried over anhydrous magnesium sulfate. The dried solution was stripped of solvent to yield the desired product S - (2 - semicarbazonoethyl) O,O - diethyl thiolothionophosphate as a yellow oil.

EXAMPLE 4

Preparation of S-(formylmethyl) O-methyl N-isopropylthiolophosphoramidate

Aqueous chloroacetaldehyde (17.4 grams; 45% concentration; 0.10 mole), water (30 ml.) and potassium O-methyl N-isopropylthiolophosphoramidate (21.7 grams; 0.11 mole) are charged into a glass reaction flask equipped with a mechanical stirrer, thermometer and heating means. The reaction mixture is heated for a period of about 30 minutes at a temperature of about 50° C. resulting in the formation of an oil phase. The reaction mixture is then cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product S-(formylmethyl) O-methyl N-isopropylthiolophosphoramidate.

EXAMPLE 5

Preparation of S-[2-(4,4-dimethylsemicarbazono)ethyl] O-methyl N-isopropylthiolophosphoramidate S - (formylmethyl) O - methyl N - isopropylthiolophosphoramidate (10.5 grams; 0.05 mole), absolute ethanol (60 ml.) and 4,4-dimethylsemicarbazide (7.2 grams; 0.07 mole) are charged into a glass reaction vessel equipped with a mechanical stirrer, reflux condenser and heating means. The reaction mixture is heated at reflux for a period of about 40 minutes. After this time the mixture is stripped of ethanol and the residue is dissolved in methylene chloride. The resulting solution is washed with water and is dried over anhydrous magnesium sulfate. The dried solution is then stripped of solvent to yield the desired product S-[2-(4,4-dimethylsemicarbazono) ethyl] O-methyl N-isopropylthiolophosphoramidate.

EXAMPLE 6

Preparation of O-(formylmethyl) S-methyl S-(3,4-dichlorophenyl) dithiolophosphate Aqueous chloroacetaldehyde (17.4 grams; 45% concentration; 0.10 mole), water (30 ml.) and potassium S-methyl S - (3,4 - dichlorophenyl)dithiolophosphate (36 grams; 0.11 mole) are charged into a glass reaction flask equipped with a mechanical stirrer, thermometer and heating means. The reaction mixture is then heated for a period of about 50 minutes at a temperature of about 45° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product O-(formylmethyl) S-methyl S-(3,4-dichlorophenyl) dithiolophosphate.

EXAMPLE 7

Preparation of O-[2-(2-methyl-4,4-diethylsemicarbazono) ethyl] S-methyl S-(3,4-dichlorophenyl) dithiolophosphate O-(formylmethyl) S-methyl S-(3,4-dichlorophenyl) dithiolophosphate (18.3 grams; 0.05 mole), absolute ethanol (50 ml.) and 2-methyl-4,4-diethylsemicarbazide (10.2 grams; 0.07 mole) are charged into a glass reaction vessel equipped with a mechanical stirrer, reflux condenser and heating means. The reaction mixture is heated at reflux for a period of about 45 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product O-[2-(2-methyl-4,4-diethylsemicarbazono)ethyl] S-methyl S-(3,4 - dichlorophenyl) dithiolophosphate.

EXAMPLE 8

Preparation of S-(formylmethyl) O-(2-ethyl - 4 - bromophenyl) O-(2-allyl-4-methoxyphenyl) thiolothionophosphate Aqueous chloroacetaldehyde (17.4 grams; 45% concentration; 0.10 mole), water (50 ml.) added potassium O - (2 - methyl - 4 - bromophenyl) O-(2-allyl-4-methoxyphenyl) thiolothionophosphate (53.1 grams; 0.11 mole) are charged into a glass reaction flask equipped with a mechanical stirrer, thermometer and heating means. The reaction mixture is then heated for a period of about one hour at a temperature of about 50° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product S-(formylmethyl) O-(2-ethyl-4-bromophenyl) O-(2-allyl-4-methoxyphenyl) thiolothionophosphate.

EXAMPLE 9

Preparation of S-[2-(2 - propyl - 4 - cyclohexylsemicarbazono)ethy] O-(2-methyl-4-bromophenyl) O-(2-allyl-4-methoxyphenyl) thiolothionophosphate S-(formylmethyl) O-(2-methyl-4-bromophenyl) O-(2-allyl - 4 - methoxyphenyl) thiolothionophosphate (24.3 grams; 0.05 mole), absolute ethanol (80 ml.) and 2-propyl-4-cyclohexylsemicarbazide (13.6 grams; 0.07 mole) are charged into a glass reaction vessel equipped with a mechanical stirrer, reflux condenser and heating means. The reaction mixture is heated at reflux for a period of about 60 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product S - [2 - (2 - propyl-4-cyclohexylsemicarbazono)ethyl] O-(2-methyl-4-bromophenyl) O-(2-allyl-4-methoxyphenyl) thiolthionophosphate.

EXAMPLE 10

Preparation of S-(formylmethyl) O-(2-methylthio-4-nitrophenyl) thiolothionophosphoramidate Aqueous chloroacetaldehyde (17.4 grams; 45% concentration; 0.10 mole), water (35 ml.) and potassium O-(2-methylthio - 4 - nitrophenyl) thiolothionophosphoramidate (36.5 grams; 0.11 mole) are charged into a glass reaction flask equipped with a mechanical stirrer, thermometer and heating means. The reaction mixture is then heated for a period of about 30 minutes at a temperature of about 45° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product S-(formylmethyl) O-(2-methylthio - 4 - nitrophenyl) thiolothionophosphoramidate.

EXAMPLE 11

Preparation of S - [2 - (2-hexyl-4-$\beta$-chloroethylsemicarbazono)ethyl] O-(2 - methylthio-4-nitrophenyl) thiolothionophosphoramidate S-(formylmethyl) O-(2-methylthio-4-nitrophenyl) thiolothionophosphoramidate (16.8 grams; 0.05 mole), absolute ethanol (60 ml.) and 2-hexyl-4-$\beta$-chloroethylsemicarbazide (15.5 grams; 0.07 mole) are charged into a glass reaction vessel equipped with a mechanical stirrer, reflux condenser and heating means. The reaction mixture is heated at reflux for a period of about 40 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product S-[2-(2-hexyl-4-$\beta$-chloroethylsemicarbazono)ethyl] O-(2 - methylthio - 4 - nitrophenyl) thiolothionophosphoramidate.

EXAMPLE 12

Preparation of O-(formylmethyl) O-(3-dimethylaminophenyl) methylphosphonate

Aqueous chloroacetaldehyde (17.4 grams; 45% concentration; 0.10 mole), water (25 ml.) and potassium O-(3-dimethylaminophenyl) methylphosphonate (25.4 grams; 0.11 mole) are charged into a glass reaction flask equipped with a mechanical stirrer, thermometer and heating means. The reaction mixture is then heated for a period of about 30 minutes at a temperature of about 60° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product O-(formylmethyl) O-(3-dimethylaminophenyl) methylphosphonate.

EXAMPLE 13

Preparation of O-{2-[4-(2-methyl-4-chlorophenyl)semicarbazono]-ethyl} O-(3-dimethylaminophenyl) methylphosphonate O-(formylmethyl) O-(3-dimethylaminophenyl) methylphosphonate (23.5 grams; 0.05 mole), absolute ethanol (50 ml.) and 4-(2-methyl-4-chlorophenyl)semicarbazide (14 grams; 0.07 mole) are charged into a glass reaction vessel equipped with a mechanical stirrer, reflux condenser and heating means. The reaction mixture is heated at reflux for a period of about 45 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product O-{2-[4-(2-methyl-4-chlorophenyl)semicarbazono]ethyl} O-(3-dimethylaminophenyl) methylphosphonate.

EXAMPLE 14

Preparation of S-(formylmethyl) O-(4-trifluoromethylphenyl) O-(4-methylsulfonylbenzyl) thiolophosphate Aqueous chloroacetaldehyde (17.4 grams; 45% concentration; 0.10 mole), water (40 ml.) and potassium O-(4-trifluoromethylphenyl) O-(4-methylsulfonylbenzyl) thiolophosphate (47.2 grams; 0.11 mole) are charged into a glass reaction flask equipped with a mechanical stirrer, thermometer and heating means. The reaction mixture is then heated for a period of about 40 minutes at a temperature of about 50° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product S-(formylmethyl)O-(4-trifluoromethylphenyl) O-(4-methylsulfonylbenzyl) thiolophosphate.

EXAMPLE 15

Preparation of S-{2-[4-(2-methoxy-4-bromophenyl)-thiosemicarbazono]ethyl} O-(trifluoromethylphenyl) O-(4-methylsulfonylbenzyl) thiolophosphate S-(formylmethyl) O-(4-trifluoromethylphenyl) O-(4-methylsulfonylbenzyl) thiolophosphate (21.5 grams; 0.05 mole), absolute ethanol (60 ml.) and 4-(2-methoxy-4-bromophenyl)-thiosemicarbazide (19.3 grams; 0.07 mole) are charged into a glass reaction vessel equipped with a mechanical stirrer, reflux condenser and heating means. The reaction mixture is heated at reflux for a period of about 30 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product S-{2-[4-(2-methoxy-4-bromophenyl)-thiosemicarbazono]ethyl} O-(trifluoromethylphenyl) O-(4-methylsulfonylbenzyl) thiolophosphate.

EXAMPLE 16

Preparation of S-(formylmethyl) (allyl)(4-methylsulfinylphenyl)thiolothionophosphinate Aqueous chloroacetaldehyde (17.4 grams; 45% concentration; 0.10 mole), water (50 ml.) and potassium (allyl)(4-methylsulfinyl)thiolothionophosphinate (34.5 grams; 0.11 mole) are charged into a glass reaction flask equipped with a mechanical stirrer, thermometer and heating means. The reaction mixture is then heated for a period of about 50 minutes at a temperature of about 55° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product S-(formylmethyl) (allyl)(4-methyl-sulfinylphenyl)thiolothionophosphinate.

EXAMPLE 17

Preparation of S-{2-[4-(4-dimethylaminophenyl)carbazono]ethyl} (allyl) (4-methylsulfinylphenyl)thiolothionophosphinate S-(formylmethyl) (allyl) (4-methylsulfinylphenyl)-thiolothionophosphinate (15.9 grams; 0.05 mole), absolute ethanol (60 ml.) and 4-(4-dimethylaminophenyl) semicarbazide (13.6 grams; 0.07 mole) are charged into a glass reaction vessel equipped with a mechanical stirrer, reflux condenser and heating means. The reaction mixture is heated at reflux for a period of about 30 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product S-{2-[4-(4-dimethylaminophenyl)carbazono]ethyl} (allyl)-(4-methylsulfinylphenyl)thiolothionophosphinate.

EXAMPLE 18

Preparation of S-(formylmethyl) S,S-diethyl trithiolothionophosphate

Aqueous chloroacetaldehyde (17.4 grams; 45% concentration; 0.10 mole), water (25 ml.) and potassium S,S-diethyl trithiolothionophosphate (28.2 grams; 0.11 mole) are charged into a glass reaction flask equipped with a mechanical stirrer, thermometer and heating means. The reaction mixture is then heated for a period of about 30 minutes at a temperature of about 40° C. resulting in the formation of an oil phase. The reaction mixture is cooled to room temperature and the oil phase is extracted with ether. The ether extract is washed with water, dried over anhydrous magnesium sulfate, filtered and stripped of solvent on a steam bath. The residue is then heated in vacuo removing unreacted starting material to yield the desired product S-(formylmethyl) S,S-diethyl trithiolothionophosphate.

EXAMPLE 19

Preparation of S-{2-[4-(4-nitrophenyl)semicarbazono]-ethyl} S,S-diethyl trithiolothionophosphate S-(formylmethyl) S,S-diethyl trithiolothionophosphate (13.1 grams; 0.05 mole), absolute ethanol (50 ml.) and 4-(4-nitrophenyl)semicarbazide (13.7 grams; 0.07 mole) are charged into a glass reaction vessel equipped with a mechanical stirrer, reflux condenser and heating means. The reaction mixture is heated at reflux for a period of about 45 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product S-{2-[4-(4-nitrophenyl)semicarbazono]-ethyl} S,S-diethyl trithiolothionophosphate.

EXAMPLE 20

Preparation of S-(1-phenyl-1-formylmethyl) O,O-diethyl thiolophosphate

α-Chloro-α-phenylacetaldehyde (15.4 grams; 0.1 mole), potassium O,O-diethyl thiolophosphate (22.9 grams; 0.11 mole) and methyl ethyl ketone (100 ml.) are charged into a glass reaction vessel equipped with a mechanical stirrer, thermometer and reflux condenser. The reaction mixture is heated at reflux for a period of about one hour. After this time the mixture is filtered and the filtrate is stripped of solvent leaving a residue. The residue is dissolved in methylene chloride and the resulting solution is washed with water. The washed solution is then dried over anhydrous magnesium sulfate, filtered and stripped of methylene chloride to yield the desired product S-(1-phenyl-1-formylmethyl) O,O-diethyl thiolophosphate.

EXAMPLE 21

Preparation of S-[1-phenyl-2-(4-β-bromoethylsemicarbazono)ethyl] O,O-diethyl thiolophosphate S-(1-phenyl-1-formylmethyl) O,O-diethyl thiolophosphate (10.6 grams; 0.05 mole), 4-β-bromoethylsemicarbazide (12.7 grams; 0.7 mole) and absolute ethanol (70 ml.) are charged into a glass reaction vessel equipped with a mechanical stirrer, reflux condenser and heating means. The reaction mixture is heated at reflux for a period of about 50 minutes. After this time the mixture is stripped of ethanol and the residue is dissolved in methylene chloride. The resulting solution is washed with water and is dried over anhydrous magnesium sulfate. The dried solution is then filtered and stripped of solvent to yield the desired product S-[1-phenyl-2-(4-β-bromoethylsemicarbazono)ethyl] O,O-diethyl thiolophosphate.

Additional exemplary compounds within the scope of the present invention which can be prepared by the procedures detailed in the foregoing examples are:

S-[2-(2-butyl-4,4-di-n-propylsemicarbazono)ethyl] O,O-di-n-butyl thiolophosphate,
S-[2-(4,4-di-n-hexylsemicarbazono)ethyl] O,O-di-n-hexyl thiolophosphate,
O-[2-(4-cyclopropylsemicarbazono)ethyl] O-methyl hexylphosphonate,
O-[2-(4-cyclobutylsemicarbazono)ethyl] dibutylphosphinate,
S-[2-(4-cyclopentylsemicarbazono)ethyl] O-(3-propyl-5-iodophenyl) N,N-dimethylthiolophosphoramidate,
S-[2-(4-cycloheptylsemicarbazono)ethyl] O-(2-hexyl-4-fluorophenyl) N,N-diethylthiolophosphoramidate,
S-[2-(4-allylsemicarbazono)ethyl] O-(2-propoxyphenyl) N,N-dihexylthiolophosphoramidate,
O-{2-[4-(2-methylthiophenyl)semicarbazono]ethyl} O-(4-hexyloxyphenyl) O-(4-butylphenyl)phosphate,
O-{2-[4-(4-chloromethylphenyl)semicarbazono]ethyl} O-(3-propylthiophenyl) O-(4-trichloromethyl) phosphate,
O-{2-[4-(4-trifluoromethylphenyl)semicarbazono]ethyl} S-(4-pentylthiophenyl) S-(3-hexylbenzyl)dithiolophosphate,
O-{2-[4-(3-allylphenyl)thiosemicarbazono]ethyl} O-(3-pent-4-enylphenyl) O-(3-dipropylaminophenyl) thionophosphate,
O-{2-[4-(2-propylphenyl)thiosemicarbazono]ethyl} S-(4-ethylsulfonylphenyl) O-(3-nitrophenyl) thiolophosphate,
O-{2-[4-(2,4,6-trichlorophenyl)thiosemicarbazono]ethyl} O-(3-butylsulfonylphenyl) O-(4-di-n-hexylaminophenyl) phosphate,
O-{2-[4-(3-isopropylphenyl)thiosemicarbazono]ethyl} O-(4-propylsulfinylphenyl) S-(2-ethylthiophenyl) thiolophosphate,
S-{2-[4 (4-fluorophenyl)semicarbazono]ethyl} S-(4-pentylsulfonylphenyl) S-(4-iodophenyl) trithiolothionophosphate,
S-{2-[4-(3-propoxyphenyl)semicarbazono]ethyl} O-(4-hexylsulfinylphenyl) (3-propylthiophenethyl) thiolophosphonate,
S-{2-[4-(4-hexyloxyphenyl)semicarbazono]ethyl} O-(4-β-bromoethylphenyl) [γ-(4-hexylthiophenyl)propyl] thiolophosphonate,
O-{2-[4-(2-hexyl-4-iodophenyl)semicarbazono]ethyl} O-(4-hexylsulfonylphenyl) (2-methylthiophenyl) thionophosphonate,
S-{2-[4-(4-butylthiophenyl)semicarbazono]ethyl} S-(3-ethoxyphenethyl) (4-butylsulfinylbenzyl)dithiolophosphonate,
S-{1-methyl-2-[4-(4-dipropylaminophenyl)semicarbazono]ethyl} O-allyl (4-hexylthiophenyl)thiolothionophosphonate,
S-{1-ethyl-2-[4-(4-dihexylaminophenyl)semicarbazono]ethyl} O-pent-3-enyl S-t-butyl dithiolophosphate, S-{1-butyl-2-[4-(4-pent-3-enylphenyl)semicarbazono]ethyl} O-propyl S-allyl dithiolophosphate,
S-{1-pentyl-2-[4-(4-hexylthiophenyl)semicarbazono]ethyl} O-(4-di-n-hexylaminophenyl) (4-hexylthiophenyl)phosphonate,
O-{1-hexyl-2-[4-(2-ethyl-4-ethoxyphenyl)semicarbazono]ethyl} O-(3-ethylphenyl) S-n-hexylthiolothionophosphate,
S-[1-methoxy-2-(4,4-dimethylsemicarbazono)ethyl] O-methyl N-isopropylthiolophosphoramidate,
O-[1-propoxy-2-(4,4-dimethylsemicarbazono)ethyl] diphenylphosphinate,
S-[1-hexyloxy-2-(4,4-dimethylsemicarbazono)ethyl] diethylthiolophosphinate,
S-[1-methylthio-2-(4,4-dimethylsemicarbazono)ethyl] (3-methylthiobenzyl)methylthiolophosphinate,
O-[1-propylthio-2-(4,4-dimethylsemicarbazono)ethyl] O-ethyl N-isopropylphosphoramidate,
O-[1-butylthio-2-(4,4-dimethylsemicarbazono)ethyl] O-ethyl N-isopropylphosphoramidate,
O-[1-hexylthio-2-(4,4-dimethylsemicarbazono)ethyl] O-ethyl N-isopropylphosphoramidate,
O-[1-allyl-2-(4,4-dimethylsemicarbazono)ethyl] O-ethyl N-isopropylphosphoramidate,
O-[1-hex-5-enyl-2-(4,4-dimethylsemicarbazono)ethyl] O-ethyl N-isopropylphosphoramidate,
O-[1-benzyl-2-(4,4-dimethylsemicarbazono)ethyl] O-ethyl N-isopropylphosphoramidate,
O-[1-phenethyl-2-(4,4-dimethylsemicarbazono)ethyl] O-ethyl N-isopropylphosphoramidate,
O-[1-phenoxy-2-(4,4-dimethylsemicarbazono)ethyl] O-ethyl N-isopropylphosphoramidate,
O-[1-phenylthio-2-(4,4-dimethylsemicarbazono)ethyl] O,O-diethyl phosphate,
O-[1-(2-methyl-4-chlorophenyl)-2-(4,4-dimethylsemicarbazono)ethyl] O,O-diethyl phosphate,
O-[1-(2-propyl-4-bromophenyl)-2-(4,4-dimethylsemicarbazono)ethyl] O,O-diethyl phosphate,
O-[1-(4-hexylphenyl)-2-(4,4-dimethylsemicarbazono)ethyl] O,O-diethyl phosphate,
O-[1-(2-methoxyphenyl)-2-(4,4-dimethylsemicarbazono)ethyl] O,O-diethyl phosphate,
O-[1-(3-methylthiophenyl)-2-(4,4-dimethylsemicarbazono)ethyl] O,O-diethyl phosphate,
S-[1-(2-dimethylaminophenyl)-2-(4-methylsemicarbazono)ethyl] O,O-diethyl thiolothionophosphate,
S-[1-(3-allylphenyl)-2-(4-methylsemicarbazono)ethyl] O,O-diethyl thiolothionophosphate,
S-[1-(2-pent-4-enylphenyl)-2-(4-methylsemicarbazono)ethyl] O,O-diethyl thiolothionophosphate,
S-[1-(2-ethoxyphenyl)-2-(4-methylsemicarbazono)ethyl] O,O-diethyl thiolothionophosphate,
S-[1-(4-butoxyphenyl)-2-(4-methylsemicarbazono)ethyl] O,O-diethyl thiolothionophosphate,
S-[1-(4-hexyloxyphenyl)-2-(4-methylsemicarbazono)ethyl] O,O-diethyl thiolothionophosphate,
S-[1-(2-propylthiophenyl)-2-(4-methylsemicarbazono)ethyl] O,O-diethyl thiolothionophosphate,
S-[1-(3-pentylthiophenyl)-2-(4-methylsemicarbazono)ethyl] O,O-diethyl thiolothionophosphate,
S-[1-(4-hexylthiophenyl)-2-(4-methylsemicarbazono)ethyl] O,O-diethyl thiolothionophosphate,
S-[1-(4-trifluoromethylphenyl)-2-(4-methylsemicarbazono)ethyl] O,O-diethyl thiolothionophosphate,
S-[1-(3-β-bromoethylphenyl)-2-(4-methylsemicarbazono)ethyl] O,O-diethyl thiolothionophosphate,
S-[1-(3-chloromethylphenyl)-2-(4-methylsemicarbazono)ethyl] O,O-diethyl thiolothionophosphate,
S-[4-iodophenyl)-2-(4-methylsemicarbazono)ethyl] O,O-diethyl thiolothionophosphate,
S-[1-(4-fluorophenyl)-2-(4-methylsemicarbazono)ethyl] O,O-diethyl thiolothionophosphate,
S-[1-(4-nitrophenyl)-2-(4-methylsemicarbazono)ethyl] O,O-diethyl thiolothionophosphate,
S-[1-(4-methylsulfonylphenyl)-2-(4-methylsemicarbazono)-ethyl] O,O-diethyl thiolothionophosphate,
S-[1-(4-propylsulfonylphenyl)-2-(4-methylsemicarbazono)ethyl] O,O-diethyl thiolothionophosphate,
S-[1-(4-hexylsulfonylphenyl)-2-(4-methylsemicarbazono)ethyl] O,O-diethyl thiolothionophosphate,
S-[1-(4-methylsulfinylphenyl)-2-(4-methylsemicarbazono)ethyl] O,O-diethyl thiolothionophosphate,
S-[1-(4-ethylsulfinylphenyl)-2-(4-methylsemicarbazono)ethyl] O,O-diethyl thiolothionophosphate,
S-[1-(4-butylsulfinylphenyl)-2-(4-methylsemicarbazono)ethyl] O,O-diethyl thiolothionophosphate,
S-[1-(1-butylsulfinylphenyl)-2-(4-methylsemicarbazono)ethyl] O,O-diethyl thiolothionophosphate,
S-[1-(4-hexylsulfinylphenyl)-2-(4-methylsemicarbazono)ethyl] O,O-diethyl thiolothionophosphate,
S-[1-(2,4,6-trichlorophenyl)-2-(4-methylsemicarbazono)ethyl] O,O-diethyl thiolothionophosphate,
S-[1-(3-dipropylaminophenyl)-2-(4-methylsemicarbazono)ethyl] O,O-diethyl thiolothionophosphate,
S-[1-(4-dihexylaminophenyl)-2-(4-methylsemicarbazono)ethyl] O,O-diethyl thiolothionophosphate.

For practical use as insecticides or acaricides, the compounds of this invention are generally incorporated into insecticidal or acaricidal compositions which comprise an inert carrier and an insecticidally or acaricidally toxic amount of such a compound. Such insecticidal or acaricidal compositions, which can also be called formulations, enable the active compound to be applied conveniently to the site of the insect or acarid infestation in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides or acaricides can be dispersed under superatmospheric pressure as aerosols. However, preferred liquid insecticidal or acaricidal compositions are emulsifiable concentrates, which comprise an active compound according to this invention and as the inert carrier a solvent and an emulsifier. Such emulsifiable concentrates can be extended with water and/or oil to any desired concentration of active compound for application as sprays to the site of the insect or acarid infestation. The emulsifiers most commonly used in these concentrates are nonionic or mixtures of nonionic with anionic surface-active agents.

A typical insecticidal or acaricidal composition according to this invention is illustrated by the following example, in which the quantities are in parts by weight.

EXAMPLE 22

Preparation of a dust

| | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect or acarid infestation.

The compounds of this invention can be applied as insecticides or acaricides in any manner recognized by the art. One method for destroying insects or acarids comprises applying to the locus of the insect or acarid infestation, an insecticidal or acaricidal composition comprising an inert carrier and, as an essential active ingredient, in a quantity which is toxic to said insects or acarids, a compound of the present invention. The concentration of the new compounds of this invention in the insecticidal or acaricidal compositions will vary greatly with the type of formulation and the purpose for which it is designed, but generally the insecticidal or acaricidal compositions will comprise from about 0.05 to about 95 percent by weight of the active compounds of this invention. In a preferred embodiment of this invention, the insecticidal or acaricidal compositions will comprise from about 5 to about 75 percent by weight of the active compound. The compositions can also comprise such additional substances as other pesticides, stabilizers, spreaders, deactivators, adhesives, stickers, fertilizers, activators, synergists and the like.

The compounds of the present invention are also useful when combined with other insecticides or acaricides in the compositions heretofore described. The other insecticides or acaricides can comprise from about 5% to about 95% of the active ingredients in the compositions. Use of the combinations of these other insecticides or acaricides with the compounds of the present invention provide insecticidal and/or acaricidal compositions which are more effective in controlling insects or acarids and often provide results unattainable with separate compositions of the individual compounds. The other insecticides or acaricides with which the compounds of this invention can be used in the insecticidal or acaricidal compositions to control insects or acarids include halogenated compounds such as DDT, methoxychlor, TDE, lindane, chlordane, isobenzan, aldrin, dieldrin, heptachlor, endrin, mirex, endosulfon, dicofol and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene and the like; organic carbamate compounds such as carbaryl, ortho 5353 and the like; organic sulfur compounds such as phenothiazine, phenoxathin, lauryl thiocyanate, [bis(2-thiocyanoethyl)-ether], isobornyl thiocyanoacetate and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradichlorobenzene and the like.

The compounds of the present invention can also be combined with fungicidal and nematocidal chemical compounds to form pesticidal compositions useful for the control of fungi and in some cases soil nematodes as well as insects or acarids. Typical examples of such fungicidal chemical compounds are ferbam, nabam, zineb, ziram, thiram, chloranil, dichlone, glyodin, cycloheximide, dinocap, maneb, captan, dodine, PCNB, p-dimethylaminobenzenediazo sodium sulfonate and the like; while examples of nematocidal compounds are chloropicrin, O,O-diethyl O-(2,4 - dichlorophenyl) phosphorothioate, tetrachlorothiophene, dazomet, dibromochloropropane and the like.

The new compounds of this invention can be used in many ways for the control of insects or acarids. Insecticides or acaricides which are to be used as stomach poisons or protective materials can be applied to the surface on which the insects or acarids feed or travel. Insecticides or acaricides which are to be used as contact poisons or eradicants can be applied directly to the body of the insect or acarid, as a residual treatment to the surface on which the insect or acarid may walk or crawl, or as a fumigant treatment of the air which the insect or acarid breathes. In some cases, the compounds applied to the soil or plant surfaces are taken up by the plant, and the insects or acarids are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm; worms or weevils, such as the codling moth, the alfalfa weevil, the cotton boll weevil, the pink boll worm, the plum curculio, the red banded leaf roller, the melonworm, the cabbage looper and the apple maggot; leaf miners, such as the apple leaf miner, the birch leaf miner and the beet leaf miner; and gall insects, such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect or acarid control will depend on a variety of factors, such as the specific insect involved, intensity of the infestation, weather, type of environment, type of formulation and the like. For example, the application of only one or two ounces of active chemical per acre may be adequate for control of a light infestation of an insect or acarid under conditions unfavorable for its feeding, while a pound or more of active compound per acre may be required for the control of a heavy infestation of insects or acarids under conditions favorable to their development.

The insecticidal and acaricidal activity of the compounds of the present invention was demonstrated in experiments wherein the compound S-(2-thiosemicarbazonoethyl) O,O-diethyl thiolothionophosphate tested for the control of the two-spotted spider mite, the housefly and the boll weevil. The test procedures and results are shown below.

Two-Spotted Spider Mite—Contact Poison

Potted horticultural bean at growth stage when primary leaves are approximately one inch long are infested with two-spotted spider mites twenty-four (24) hours prior to treatment, insuring establishment of adults and egg deposition at time of treatment.

The candidate compound is dissolved in a suitable solvent (acetone, methanol or other) or prepared as wettable powders and diluted to appropriate concentrations with deionized water containing wetting and/or dispersing agents as appropriate.

Infested host plants, as above, are dipped in agitated solutions of the candidate compound, allowed to air dry, provided with subterranean water source and held for observation. Three plants are used for each unit of treatment.

Initial mortality and phytotoxicity are determined forty-eight (48) to seventy-two (72) hours after treatment by removing and observing one leaf from each plant. Final observations of mortality are made seven (7) days after treatment by removal and observation of the second primary leaf.

Housefly—Liquid Bait

The candidate compound is prepared as an acetone or wettable powder-based aqueous formulation containing 5 percent (w.:v.) dissolved granular sugar. One milliliter, expressed in p.p.m. active ingredient, is pipetted onto the center of a 9 cm. petri dish. Two-day old housefly adults, loaded into a 4-inch hemispherical wire mesh container, are then caged over the liquid bait. Approximately six (6) hours later a water-moistened wad of cellucotton is placed on top of the wire mesh cage and retained there overnight.

Observations are made for 24-hour mortality. Mortality induced may be by ingestion, contact or repellant-induced starvation.

Boll Weevil—Liquid Bait

The candidate compound is prepared as an acetone or wettable powder-based aqueous formulation containing 5 percent (w.:v.) dissolved granular sugar. One milliliter, expressed in p.p.m. active ingredient, is pipetted onto a 9 cm. filter paper in a 9 cm. petri dish. Five (5) boll weevil adults are introduced and the petri dish cover affixed.

Observations are made for mortality after 72 hours. Mortality induced may be by contact, ingestion or fumigant action.

TEST I.—TEST RESULTS

| Concentration of test compound, p.p.m.: | Insect and test procedure* | | |
|---|---|---|---|
| | TSM-C | HF-B | BW-B |
| | Percent control | | |
| 1,000 | 100 | 100 | 100 |
| 500 | 100 | 100 | 100 |
| 250 | 100 | 100 | 100 |

*TSM-C=Two spotted spider mite, contact poison; HF-B=Housefly, bait; BW-B=Boll weevil, bait.

I claim:

1. A compound of the formula

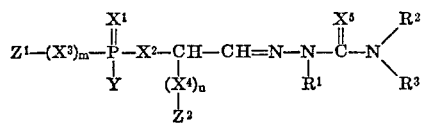

wherein $X^1$, $X^2$, $X^3$, $X^4$ and $X^5$ are independently selected from the group consisting of oxygen and sulfur; $m$ and $n$ are each integers from 0 to 1; $Z^1$ is selected from the group consisting of lower alkyl, lower alkenyl and

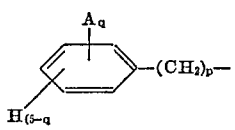

wherein A is selected from the group consisting of lower alkyl, lower alkenyl, lower alkoxy, lower alkylthio, lower haloalkyl, halogen, nitro, lower alkylsulfoxide, lower alkylsulfone and di(lower alkyl)amino; and $q$ and $p$ are each integers from 0 to 3; $Z^2$ is selected from the group consisting of hydrogen and $Z^1$, provided that when $Z^2$ is hydrogen then $n$ is zero; Y is selected from the group consisting of lower alkyl, lower alkenyl, lower alkoxy, lower alkenyloxy, lower alkylthio, amino, lower alkylamino, di(lower alkyl)amino and

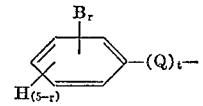

wherein B is selected from the group consisting of lower alkyl, lower alkenyl, lower alkoxy, lower alkythio, halogen, nitro, lower alkylsulfoxide, lower alkylsulfone and di(lower alkyl)amino; $r$ is an integer from 0 to 3; Q is selected from the group consisting of oxygen, sulfur, lower alkylene, lower alkyleneoxy and lower alkylthio; and $t$ is an integer from 0 to 1; $R^1$ is selected from the group consisting of hydrogen and lower alkyl; and $R^2$ and $R^3$ are independently selected from the group consisting of hydrogen, lower alkyl, lower alkenyl, lower haloalkyl, cycloalkyl having from 3 to 7 carbon atoms and

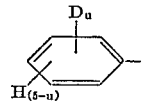

wherein D is selected from the group consisting of lower alkyl, lower alkenyl, lower alkoxy, lower alkylthio, halogen, lower haloalkyl, nitro and di(lower alkyl)amino; and $u$ is an integer from 0 to 3.

2. The compound of Claim 1, S-(2-thiosemicarbazonoethyl) O,O-diethyl thiolothionophosphate.

3. The compound of Claim 1, S-(2-semicarbazonoethyl)-O,O-diethyl thiolothionophosphate.

4. The compound of Claim 1, S-[2-(4,4-dimethylsemicarbazono)ethyl] O-methyl N-isopropylthiolophosphoramidate.

5. The compound of Claim 1, O-[2-(2-methyl-4,4-diethylsemicarbazono)ethyl] S - methyl S - (3,4 - dichlorophenyl) dithiolophosphate.

6. The compound of Claim 1, S-[2-(2-propyl-4-cyclohexylsemicarbazono)ethyl] O - (2 - methyl - 4 - bromophenyl) O-(2-allyl-4-methoxyphenyl) thiolothionophosphate.

References Cited

UNITED STATES PATENTS 3,712,914  1/1973  Tilles  260—938 X

ANTON H. SUTTO, Primary Examiner

U.S. Cl. X.R.

260—938, 968; 424—211